United States Patent
Hsieh et al.

(10) Patent No.: US 12,541,938 B2
(45) Date of Patent: Feb. 3, 2026

(54) ORIENTATION ADJUSTMENT METHOD AND ORIENTATION ADJUSTMENT DEVICE OF DISPLAYED IMAGE

(71) Applicant: Aver Information Inc., New Taipei (TW)

(72) Inventors: Min-Chia Hsieh, New Taipei (TW); Cheng-Mou Tsai, New Taipei (TW)

(73) Assignee: AVER INFORMATION INC., New Taipei (TW)

( * ) Notice: Subject to any disclaimer, the term of this patent is extended or adjusted under 35 U.S.C. 154(b) by 466 days.

(21) Appl. No.: 17/980,603

(22) Filed: Nov. 4, 2022

(65) Prior Publication Data

US 2023/0146884 A1    May 11, 2023

(30) Foreign Application Priority Data

Nov. 9, 2021  (TW) .................................. 110141637

(51) Int. Cl.
| | |
|---|---|
| G06V 10/24 | (2022.01) |
| G06V 10/25 | (2022.01) |
| G06V 10/74 | (2022.01) |
| G09G 5/36 | (2006.01) |

(52) U.S. Cl.
CPC ............ *G06V 10/242* (2022.01); *G06V 10/25* (2022.01); *G06V 10/761* (2022.01); *G09G 5/36* (2013.01); *G09G 2340/0492* (2013.01)

(58) Field of Classification Search
None
See application file for complete search history.

(56) References Cited

U.S. PATENT DOCUMENTS

| | | | |
|---|---|---|---|
| 2011/0169746 A1* | 7/2011 | Kitajima | G06V 40/28 345/173 |
| 2016/0191875 A1* | 6/2016 | Nagao | G06F 3/03545 348/601 |

* cited by examiner

*Primary Examiner* — SJ Park
*Assistant Examiner* — Caroline E. Depalma
(74) *Attorney, Agent, or Firm* — McClure, Qualey & Rodack, LLP

(57) ABSTRACT

The present invention provides an orientation adjustment device and an orientation adjustment method of a displayed image. The orientation adjustment method includes the following steps. Step 1 is to capture a first image frame and a second image frame sequentially by an image capturing unit. Step 2 is to obtain a plurality of first pixel feature values near a first side in the first image frame. Step 3 is to obtain a plurality of second pixel feature values near the first side in the second image frame. Step 4 is to obtain a difference feature value according to the first pixel feature value and the second pixel feature value. Step 5 is to rotate the image frames output by the image capture unit so that the first side is corresponding to the predetermined display side if the difference feature value is greater than a threshold.

12 Claims, 8 Drawing Sheets

ORIENTATION ADJUSTMENT METHOD AND ORIENTATION ADJUSTMENT DEVICE OF DISPLAYED IMAGE

CROSS REFERENCE TO RELATED APPLICATIONS

This Non-provisional application claims priority under 35 U.S.C. § 119 (a) on Patent Application No. 110141637 filed in Taiwan, Republic of China on Nov. 9, 2021, the entire contents of which are hereby incorporated by reference.

BACKGROUND OF THE INVENTION

Field of the Invention

The present invention relates to an adjustment method of a displayed image and the adjustment device thereof, in particular to the orientation adjustment method and the orientation adjustment device of the displayed image for automatically adjusting the orientation.

Descriptions of the Related Art

The document camera (or the document projector) captures a two-dimensional or three-dimensional image of the photographed subject through a lens and an adjustable mechanical structure, and then displays the digital image of the photographed subject through the display device for sharing to form a display system. Because the document camera can share images in real time, it plays an increasingly important role in the field of teaching fields.

A document camera can be connected to a display by a physical cable or by wireless transmission for the purpose of communication and data transmission. The document camera has an image capture unit and a placement platform. The image capture unit captures an image within the range of the placement platform, and outputs the image to the display. The display can display the image on a display surface after receiving the image.

In general, the image captured by the image capture unit of the document camera and the image displayed on the display surface of the display should have the same orientation. However, since the placement platform of the document camera does not limit its placement orientation, the user can place items on the placement platform from any orientation. For example, a user places an item on the placement platform from the bottom of the placement platform in his perception, but as displayed on the display, the item may be entered from the right side of the display surface. As a result, when the user wants to adjust the position of the item, spatial confusion may occur, and the user cannot operate intuitively because its orientation is different from the orientation of user. For example, the user wants to adjust the item to the right from the display surface, but the user actually has to adjust it upward, which is not intuitive.

Therefore, it is one of the subjects to provide an orientation adjustment method of the displayed image and the orientation adjustment device to adjust the orientation of the image output on the display surface by the camera or the projector so that the user can intuitively operate the camera (or projector).

SUMMARY OF THE INVENTION

In view of the foregoing, an object of the invention is to provide an orientation adjustment device and an orientation adjustment method thereof which can automatically rotate the displayed image according to the usage of the user.

In order to achieve the above object, the present invention provides the orientation adjustment method of the displayed image which is applied by an image capture unit and a display unit. The image capture unit outputs a plurality of image frames according to a photographed subject, and each image frame has a capturing edge. The display unit has a display edge. The capturing edge includes at least a first side, and the display edge has a predetermined display side. The orientation adjustment method includes the following steps. The first step is to sequentially capture a first image frame and a second image frame by the image capture unit. The second step is to obtain a plurality of first pixel feature values associated with a first judgment area in the first image frame, wherein the first judgment area is close to the first side. The third step is to obtain a plurality of second pixel feature values associated with the first judgment area in the second image frame. The fourth step is to obtain a maximum difference feature value according to the first pixel feature values and the second pixel feature values. The fifth step is to rotate the image frames output by the image capture unit when the maximum difference feature value is greater than a threshold so that the first side of each image frame is located on the predetermined display side of the display unit.

In one embodiment, the total number of pixels of the first judgment area is greater than the total number of pixels of the first side of the first image frame, and the total number of pixels in the first judgment area is less than half of the total number of pixels of the first image frame.

In one embodiment, the orientation adjustment method of the displayed image further includes comparing the first pixel feature values of the first judgment area of the first image frame with the second pixel feature values of the first judgment area of the second image frame thereby obtaining a first difference feature value and setting the first difference feature value as the maximum difference feature value.

In one embodiment, the step of comparing the first pixel feature values of the first judgment area of the first image frame with the second pixel feature values of the first judgment area of the second image frame includes sequentially comparing the first pixel feature value corresponding to the pixel in the first judgment area of the first image frame with the second pixel feature value corresponding to the pixel in the first judgment area of the second image frame.

In one embodiment, the orientation adjustment method of the displayed image further includes the following steps. First is to obtain a plurality of first pixel feature values associated with a second judgment area of the first image frame, wherein the second judgment area is close to the second side. Then is to obtain a plurality of second pixel feature values associated with the second judgment area of the second image frame. Then is to compare the first pixel feature values in the first judgment area of the first image frame with the second pixel feature values in the first judgment area of the second image frame and obtain a first difference feature value accordingly. Then is to compare the first pixel feature values in the second judgment area of the first image frame with the second pixel feature values in the second judgment area of the second image frame and obtain a second difference feature value accordingly. Final is to compare the first difference feature value with the second difference feature value to obtain the maximum difference feature value.

In one embodiment, the capturing edge of each image frame further includes a third side and a fourth side, and after capturing the first image frame and the second image frame, further includes the following steps. First is to obtain a plurality of first pixel feature values associated with a third judgment area in the first image frame, wherein the third judgment area is close to the third side. Then is to obtain a plurality of second pixel feature values associated with the third judgment area in the second image frame. Then is to obtain a plurality of first pixel feature values associated with a fourth judgment area in the first image frame, wherein the fourth judgment area is close to the fourth side. Then is to obtain a plurality of second pixel feature values associated with the fourth judgment area in the second image frame. Then is to compare the first pixel feature values of the third judgment area in the first image frame with the second pixel feature values of the third judgment area in the second image frame thereby obtain a third difference feature value. Then is to compare the first pixel feature values of the fourth judgment area in the first image frame with the second pixel feature values of the fourth judgment area in the second image frame thereby obtain a fourth difference feature value accordingly. Final is to compare the first difference feature value, the second difference feature value, the third difference feature value, and the fourth difference feature value to obtain the maximum difference value.

In addition, to achieve the above object, the present invention provides an orientation adjustment device of a displayed image, which is cooperated with a display unit. The display unit has a display edge, which has a predetermined display side. The orientation adjustment device includes an image capture unit, a pixel feature value generation unit, a comparison unit, and an execution unit. The image capture unit sequentially captures a first image frame and a second image frame according to a photographed subject, each image frame has a capturing edge, and the capturing edge includes a first side. The pixel feature value generation unit is electrically connected with the image capture unit to obtain a plurality of first pixel feature values associated with a first judgment area in the first image frame and to obtain a plurality of second pixel feature values associated with the first judgment area in the second image frame, wherein the first judgment area is close to the first side. The comparison unit is electrically connected to the pixel feature value generation unit, and a maximum difference feature value is obtained according to the first pixel feature values and the second pixel feature values. The execution unit is electrically connected to the comparison unit and the image capture unit respectively. The image frames output by the image capture unit is rotated when the maximum difference feature value is greater than a threshold so that the first side of each image frame is located on the predetermined display side of the display unit.

In one embodiment, the comparison unit compares the first pixel feature values of the first judgment area of the first image frame with the second pixel feature values of the first judgment area of the second image frame thereby obtaining a first difference feature value and setting the first difference feature value to be the maximum difference feature value.

In one embodiment, the comparison unit sequentially compares the first pixel feature value corresponding to the pixels in the first judgment area of the first image frame with the second pixel feature value corresponding to the pixels in the first judgment area of the second image frame.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

The parts in the drawings are not necessarily drawn to scale, the emphasis instead being placed upon clearly illustrating the principles of at least one embodiment. In the drawings, like reference numerals designate corresponding parts throughout the various diagrams, and all the diagrams are schematic.

DESCRIPTION OF THE PREFERRED EMBODIMENT

Figure 1A:
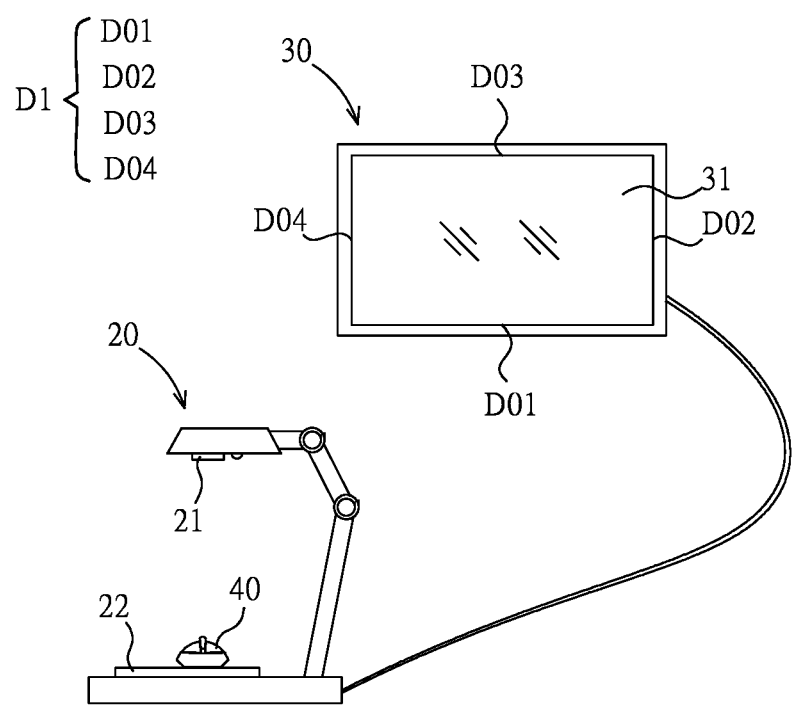
FIG. 1A is a schematic diagram showing the document camera and the display device used in conjunction with the orientation adjustment method of the displayed image of the present invention.

In the following description, this invention will be explained with reference to embodiments thereof. However, the description of these embodiments is only for purposes of illustration rather than limitation.

The orientation adjustment method of a displayed image of the present invention is applied by an image capture unit and a display unit. Please refer to FIGS. 1A and 1B, which are schematic diagrams showing a document camera 20 and a display device 30. The document camera 20 has an image capture unit 21 and a placement platform 22 arranged oppositely. The image capture unit 21 captures an image within a photographed range in the placement platform 22. The display device 30 has a display unit 31 for displaying the image captured by the image capture unit 21 of the document camera 20. The display device 30 can be a liquid crystal display device, a light emitting diode display device, or an organic light emitting diode display device, which is not limited herein. In addition, the display device 30 may also be included in a laptop, a desktop computer, or a mobile communication device (eg, a mobile phone or a tablet computer), which is not limited herein.

The display unit 31 has a display edge D1, which is composed of a first display side D01, a second display side D02, a third display side D03, and a fourth display side D04. In the embodiment, the first display side D01 is a side close to the bottom (for example, close to the desktop or the ground), which is set as a predetermined display side. The predetermined display side can be the factory setting or can be adjusted by the user through software, which is not limited herein.

In the embodiment, the user can place a photographed subject 40 in the photographed range on the placement platform 22, so that the image capture unit 21 transmits the images of the photographed subject 40 in sequence in the form of the image frame to the display device 30 for display on the display unit 31.

Figure 1B:
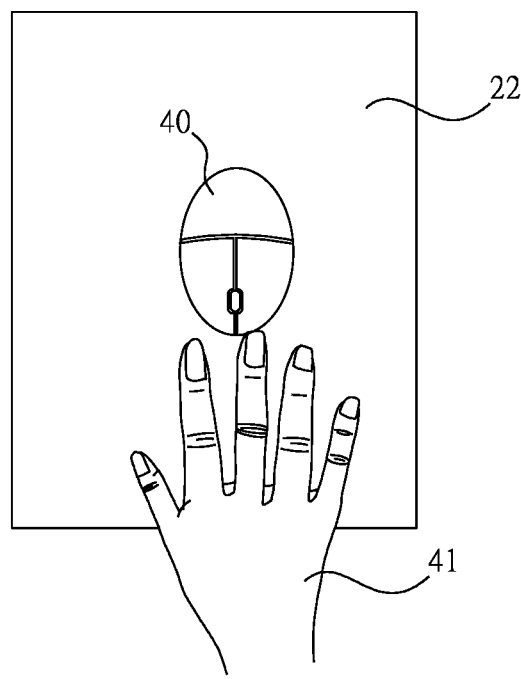
FIG. 1B is a schematic diagram showing the top view of the placement platform from the document camera.
Figure 2:
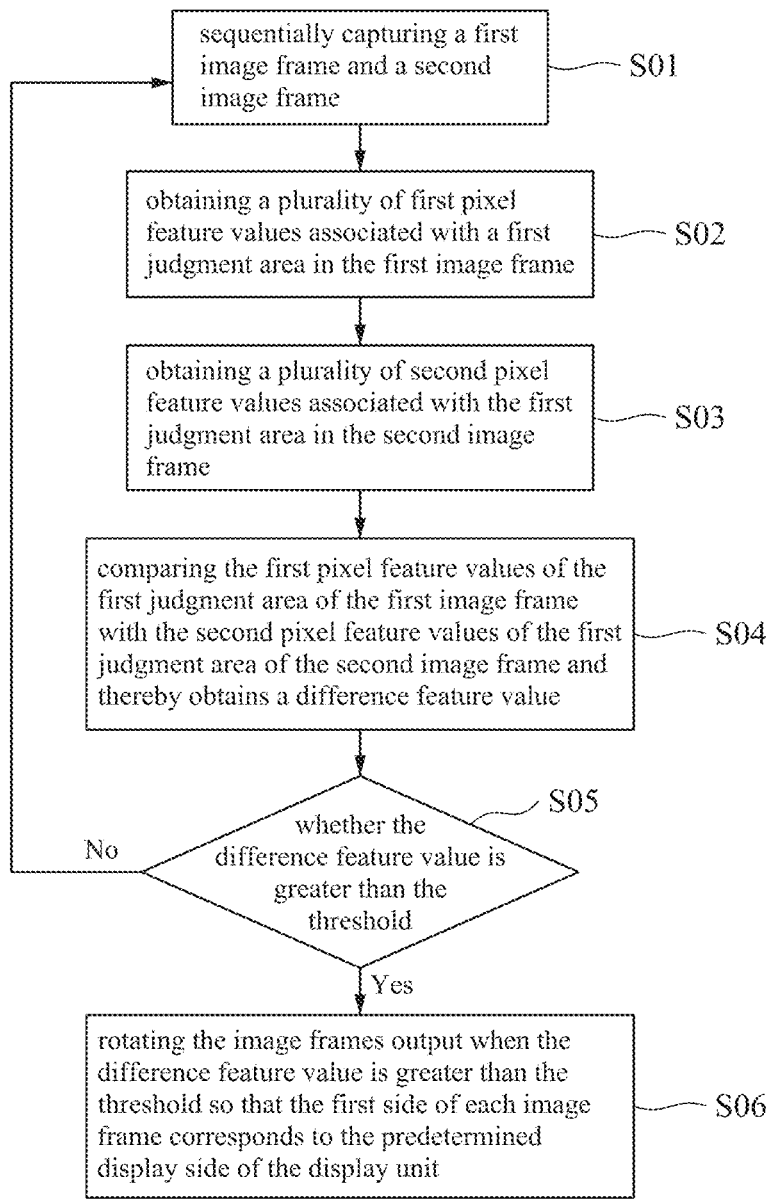
FIG. 2 is a flowchart showing the orientation adjustment method of the displayed image according to the first embodiment of the present invention.

FIG. 2 is a flowchart of the orientation adjustment method of the displayed image according to the first embodiment of the present invention. Please refer to FIGS. 1A, 1B, 2, 3A, and 3B at the same time, the orientation adjustment method of the displayed image of the first embodiment includes steps S01 to S06. First of all, it should be noted that the operating situation of the embodiment is that a mouse (the photographed subject 40) is placed on the placement platform 22 of the document camera 20, and the user extends his hand 41 from one side of his body to the placement platform 22 and enter the photographed range.

Figure 3A:
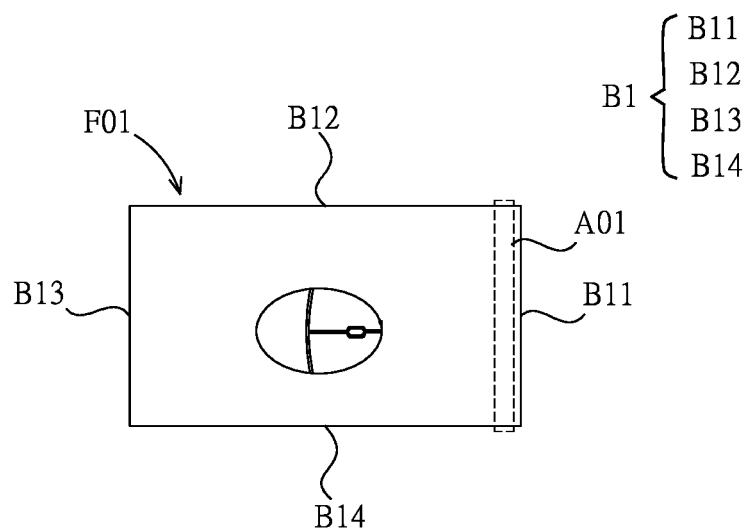
FIG. 3A is a schematic diagram showing the first image frame captured by the image capture unit according to the first embodiment of the present invention.
Figure 3B:
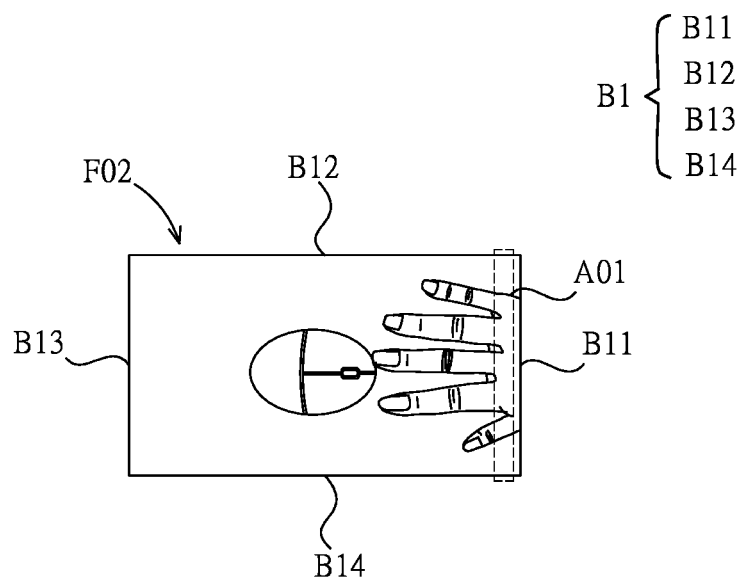
FIG. 3B is a schematic diagram showing the second image frame captured by the image capture unit according to the first embodiment of the present invention.

Step S01 is to sequentially capture a first image frame F01 (as shown in FIG. 3A) and a second image frame F02 (as shown in FIG. 3B) by the image capture unit 21. The first image frame F01 and the second image frame F02 may be two consecutive image frames or may be two image frames separated by a predetermined time. The predetermined time may be in units of time, such as but not limited to 1 millisecond (ms) or 1 second, or may be in units of frame time, such as but not limited to 10 frames, 30 frames, or 60 frames. In the embodiment, the interval between the first image frame F01 and the second image frame F02 is 500 ms or 30 frames, there is only a mouse in the first image frame F01, while the second image frame F02 includes the hand of the user extending into the photographed range in addition to the mouse.

As shown in FIGS. 3A and 3B, the first image frame F01 and the second image frame F02 respectively have a capturing edge B1. The capturing edge B1 is rectangular, which is composed of a first side B11, a second side B12, a third side B13, and a fourth side B14. In addition, the image frame is composed of a plurality of pixels. In the embodiment, for example, the resolution of the image frame is 800×600, the first side B11 and the third side B13 respectively have 600 pixels, and the second side B12 and the fourth side B14 respectively have 800 pixels, and thereby the image frame has a total of 480000 pixels. In other embodiments, if the resolution of the image frame is 1920×1020, the total number of pixels can also be deduced.

Step S02 is to obtain a plurality of first pixel feature values associated with a first judgment area A01 in the first image frame F01, wherein the first judgment area A01 is close to the first side B11 (as shown in FIG. 3A). Each pixel of the first image frame F01 of the embodiment has a first pixel feature value. The first pixel feature value may include at least one of value, chroma, and hue. In the embodiment, the first pixel feature value takes value as an example, and the value is between 0 and 255 if it is represented by 8 bits.

The total number of pixels covered by the first judgment area A01 may be equal to the total number of pixels on the first side B11 of the first image frame F01, corresponding to the embodiment, the total number of pixels in the first judgment area A01 is 600. In addition, the total number of pixels of the first judgment area A01 may also be greater than the total number of pixels of the first side B11 of the first image frame F01 and less than half of the total number of pixels of the first image frame F01, corresponding to the embodiment, the total number of pixels in the first judgment area A01 may be between 601 and 240000. Furthermore, the first judgment area A01 may be the factory setting or may be adjusted by the user through software, which is not limited herein.

In the embodiment, the total number of pixels of the first judgment area A01 is taken as an example to be equal to the total number of pixels of the first side B11 of the first image frame F01. Therefore, in step S02, the first pixel feature value in the number of 600 will be obtained, and these first pixel feature values correspond to the 600 pixels closest to the first side B11 of the first image frame F01.

Step S03 is to obtain a plurality of second pixel feature values associated with the first judgment area A01 in the second image frame F02. Similar to the foregoing description of the first image frame F01, each pixel of the second image frame F02 in the embodiment has a second pixel feature value. The definition of the second pixel feature value is the same as the definition of the first pixel feature value and the definition of the first judgment area A01 is also the same as the above and will not be repeated here.

In the embodiment, the total number of pixels of the first judgment area A01 is taken as an example to be equal to the total number of pixels of the first side B11 of the second image frame F02. Therefore, in step S03, the second pixel feature value in the number of 600 will be obtained, and these second pixel feature values correspond to the 600 pixels closest to the first side B11 of the second image frame F02.

Step S04 is to compare the first pixel feature values of the first judgment area A01 of the first image frame F01 with the second pixel feature values of the first judgment area A01 of the second image frame F02 and thereby obtains a difference feature value. In the embodiment, the comparison is performed according to the 600 first pixel feature values and the 600 second pixel feature values obtained above. Since the first image frame F01 only has a mouse, the second image frame F02 includes an image of the hand of the user near the first side B11 in addition to the mouse. In other words, among the 600 second pixel feature values, some of the second pixel feature values are different from the first pixel feature values at the same position due to the presence of the hand.

There are various comparison methods for the difference between the first pixel feature value and the second pixel feature value. The following is an example to illustrate one of the comparison methods. Here, the first pixel feature value corresponding to a pixel in the first judgment area A01 of the first image frame F01 is compared with the second pixel feature value corresponding to the pixel in the first judgment area A01 of the second image frame F02. Afterwards, the above-mentioned comparison process is also sequentially performed on other pixels. In detail, the comparison method is to compare the numerical differences of the first pixel feature value and the second pixel feature value of 600 corresponding to the same pixel one by one. When there is one difference, the value of the difference feature value with the default value of 0 can be +1. For example, if the hand occupies 360 pixels of the first side B11 of the second image frame F02, the accumulated difference feature value is 360. In other words, the difference feature value is the number of differences associated with the first pixel feature values and the second pixel feature values.

Step S05 is to determine whether the difference feature value is greater than a threshold. Step S06 is performed if the determined result is "Yes" and step S01 is repeated if the determined result is "No".

Step S06 is to rotate the image frames output by the image capture unit 21 when the difference feature value is greater than the threshold so that the first side B11 of each image frame corresponds to the predetermined display side of the display unit 31. Here, the threshold is set to prevent tiny objects (such as hair or insects) from entering the photographed range and causing the adjustment method to malfunction. In the embodiment, the threshold can be set to be greater than or equal to 25% of the total number of pixels in the first judgment area A01. Since the total number of pixels in the first judgment area A01 in the embodiment is 600, the threshold is 150. In other embodiments, according to different required sensitivity, the user can also manually adjust the threshold to a value such as 10%, 30%, or 50%, which is not limited herein.

Since the difference feature value obtained above is 360, which is greater than the threshold (150) of the embodiment, therefore, the image frame output by the image capture unit 21 will be automatically rotated by an angle so that the first side B11 of the image frame is located on the side of the predetermined display side of the display unit 31. In the embodiment, the first side B11 of the image frame is rotated to correspond to the first display side D01 of the display unit 31. Accordingly, the direction of the image observed by the user on the display unit 31 will be the same as the direction in which the user operates the document camera 20, and the photographed subject 40 on the placement platform 22 can be adjusted intuitively.

It is to be noted that the total number of pixels included in the first judgment area A01 will affect the energy consumption of system resources. That is, it will increase the energy consumption of the system during operation or judgment if the first judgment area A01 includes more total pixels. In addition, the orientation adjustment method of the displayed image can be manually executed by the user by installing software or programs in the document camera 20, wherein the operation by the user can be operated and set through the man-machine interface. In other embodiments, the software or program having the orientation adjustment method of the displayed image can also be installed in the computer connected to the document camera 20 and operated and set externally, which is not limited herein. Accordingly, the correspondence between the first side B11 of each image frame and the predetermined display side of the display unit 31 can be manually adjusted by the user. In other words, the predetermined display side can be set to be the second display side D02, the third display side D03, or the fourth display side D04 in addition to the first display side D01 described in the above-mentioned embodiment. Therefore, in the image frame, the first side B11 with the larger difference feature value can be automatically rotated to the corresponding predetermined display side.

In the above-mentioned first embodiment, only the embodiment based on the first side and the first judgment area of the image frame is described, in general, however, the image frame is rectangular and has four sides. Therefore, the second embodiment will be used to further describe the orientation adjustment method of the displayed image.

Figure 4A:
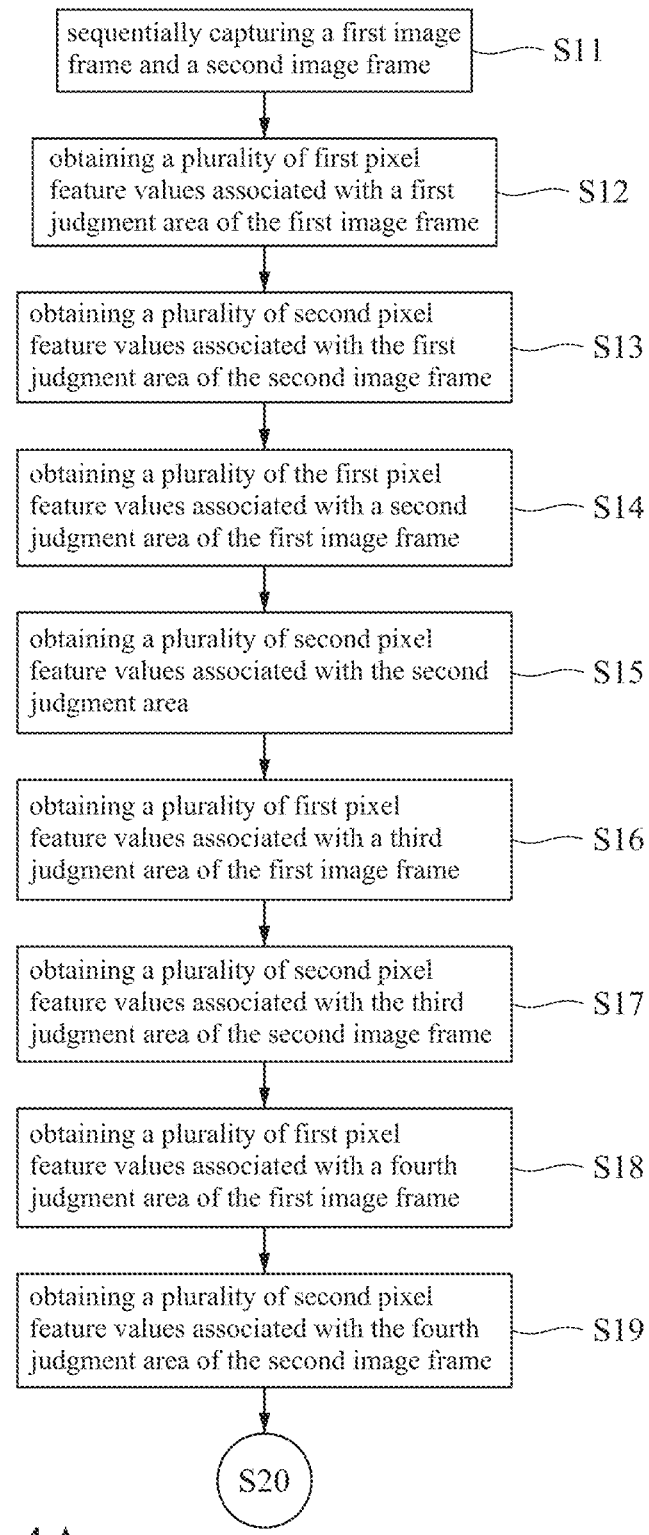
FIGS. 4A and 4B are flowcharts showing the orientation adjustment method of the displayed image according to the second embodiment of the present invention.
Figure 4B:
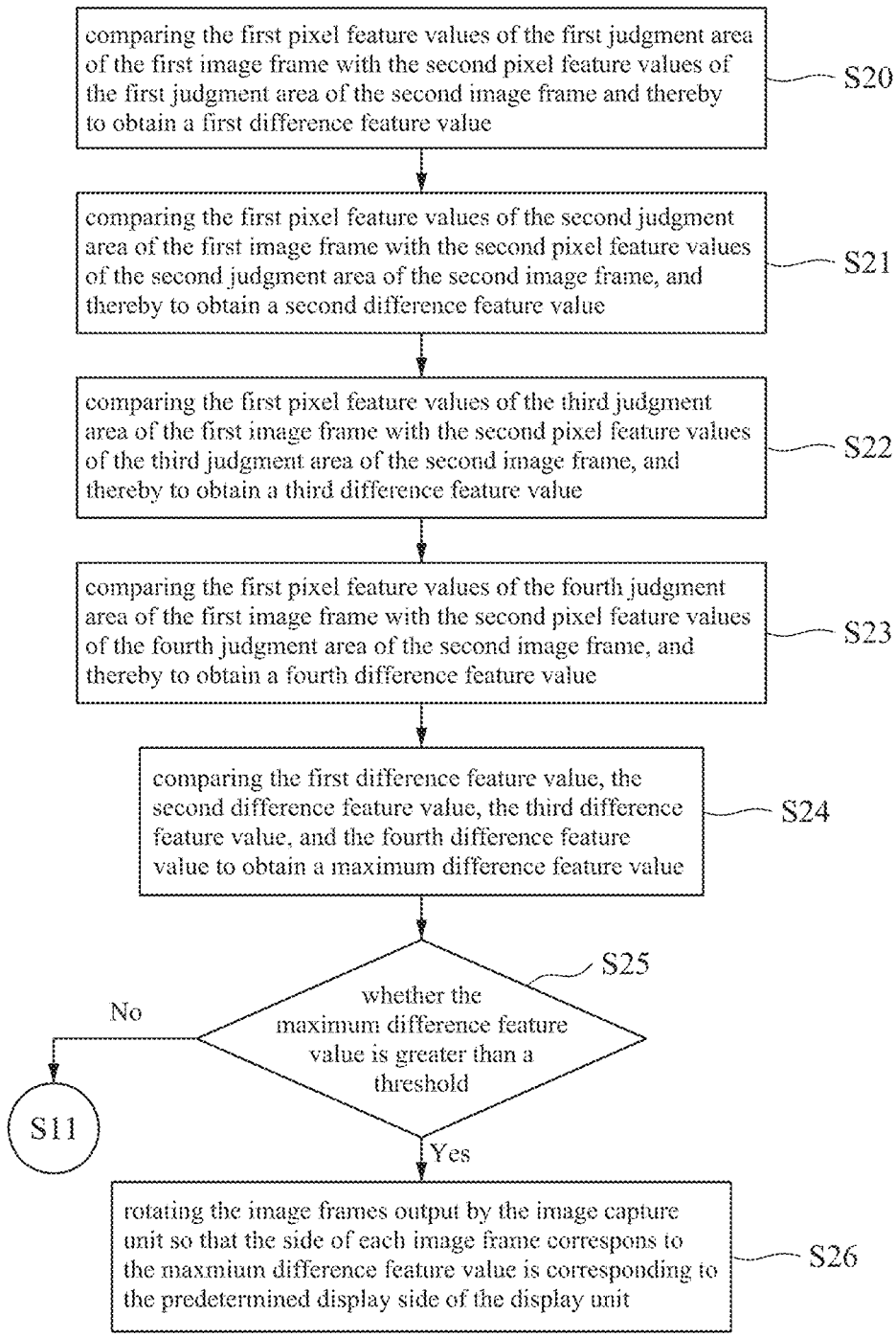

FIGS. 4A and 4B are flow charts of the orientation adjustment method of the displayed image according to the second embodiment of the present invention. Please refer to FIGS. 1A, 1B, 4A, 4B, 5A, and 5B, the orientation adjustment method of the displayed image of the second embodiment includes steps S11 to S26. It should be noted that the operation situation of the second embodiment is the same as that of the first embodiment. A mouse is placed on the placement platform 22 of the document camera 20, and the user extends his hand from one side of his body to the placement platform 22 enters the photographing range (as shown in FIGS. 1A and 1B).

Figure 5A:
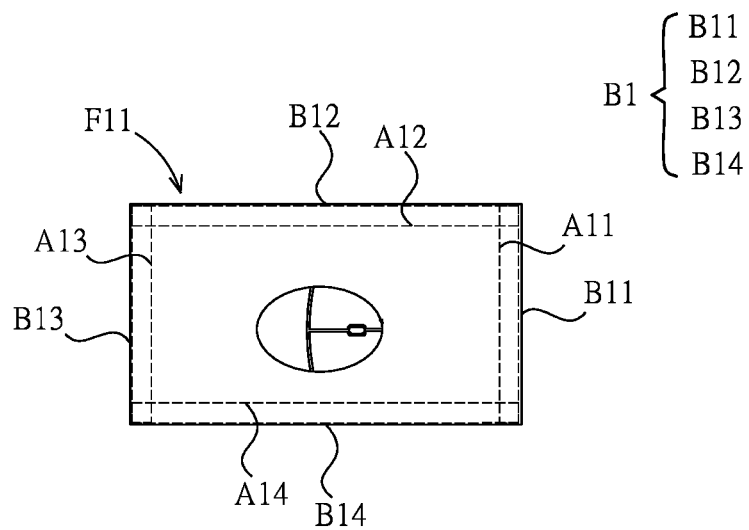
FIG. 5A is a schematic diagram showing the first image frame captured by the image capture unit according to the second embodiment of the present invention.
Figure 5B:
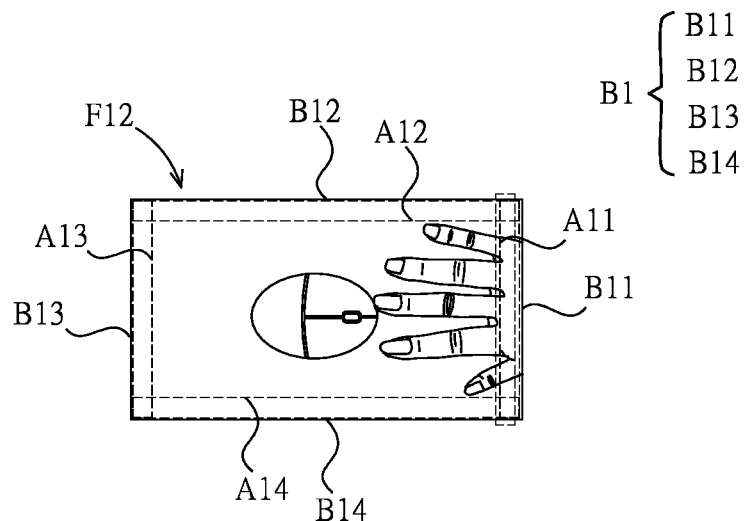
FIG. 5B is a schematic diagram showing the second image frame captured by the image capture unit according to the second embodiment of the present invention.

Referring first to FIG. 4A, in step S11, the image capture unit 21 sequentially captures a first image frame F11 (as shown in FIG. 5A) and a second image frame F12 (as shown in FIG. 5B). As shown in FIGS. 5A and 5B, the first image frame F11 and the second image frame F12 respectively have a capturing edge B11. The capturing edge B1 is composed of a first side B11, a second side B12, a third side B13 and a fourth side B14. The features and examples of the first image frame F11 and the second image frame F12 are the same as those of the first image frame F01 and the second image frame F02 in the first embodiment, so they will not be repeated here.

Step S12 is to obtain a plurality of first pixel feature values associated with a first judgment area A11 of the first image frame F11, wherein the first judgment area A11 is close to the first side B11 (as shown in FIG. 5A). Step S13 is to obtain a plurality of second pixel feature values associated with the first judgment area A11 of the second image frame F12. The features and examples of step S12 and step S13 are the same as those of step S02 and step S03 of the first embodiment, so it will not be repeated here.

Step S14 is to obtain a plurality of the first pixel feature values associated with a second judgment area A12 of the first image frame F11, wherein the second judgment area A12 is close to the second side B12. The total number of pixels covered by the second judgment area A12 may be equal to the total number of pixels on the second side B12 of the first image frame F11. Corresponding to the second embodiment, the total number of pixels in the second judgment area A12 is 800. In addition, the total number of pixels of the second judgment area A12 may also be greater than the total number of pixels of the second side B12 of the first image frame F11 and less than half of the total number of pixels of the first image frame F11. Corresponding to the second embodiment, the total number of pixels of the second judgment area A12 can also be between 801 and 240000.

Step S15 is to obtain a plurality of second pixel feature values associated with the second judgment area A12 in the second image frame F12. Similar to the description of the first image frame F11 in step S14, each pixel of the second image frame F12 in the second embodiment has a second pixel feature value. The definition of the second pixel feature value is the same as the definition of the first pixel feature value and the definition of the second judgment area A12 is also the same as that described in step S14, which will not be repeated here.

In the second embodiment, the total number of pixels of the second judgment area A12 is taken as an example to be equal to the total number of pixels of the second side B12 of the second image frame F12. Therefore, in step S15, the 800 second pixel feature values will be obtained, and these second pixel feature values correspond to the 800 pixels closest to the second side B12 of the second image frame F12.

Step S16 is to obtain a plurality of first pixel feature values associated with a third judgment area A13 of the first image frame F11, wherein the third judgment area A13 is close to the third side B13. The total number of pixels covered by the third judgment area A13 may be equal to the total number of pixels on the third side B13 of the first image frame F11. Corresponding to the second embodiment, the total number of pixels in the third judgment area A13 is 600. In addition, the total number of pixels of the third judgment area A13 may also be greater than the total number of pixels of the third side B13 of the first image frame F11 and less than half of the total number of pixels of the first image frame F11. Corresponding to the second embodiment, the total number of pixels in the third judgment area A13 may also be between 601 and 240000.

Step S17 is to obtain a plurality of second pixel feature values associated with the third judgment area A13 of the second image frame F12. Similar to the description of the first image frame F11 in step S16, each pixel of the second image frame F12 in the second embodiment has a second pixel feature value. The definition of the second pixel feature value is the same as the definition of the first pixel feature value and the definition of the third judgment area A13 is also the same as that described in step S16, which will not be repeated here.

In the second embodiment, the total number of pixels of the third judgment area A13 is taken as an example to be equal to the total number of pixels of the third side B13 of the second image frame F12. Therefore, in step S17, 600 second pixel feature values will be obtained, and these second pixel feature values correspond to 600 pixels closest to the third side B13 of the second image frame F12.

Step S18 is to obtain a plurality of first pixel feature values associated with a fourth judgment area A14 of the first image frame F11, wherein the fourth judgment area A14 is close to the fourth side B14. The total number of pixels covered by the fourth judgment area A14 may be equal to the total number of pixels on the fourth side B14 of the first image frame F11. Corresponding to the second embodiment, the total number of pixels in the fourth judgment area A14 is 800. In addition, the total number of pixels of the fourth judgment area A14 may also be greater than the total number of pixels of the fourth side B14 of the first image frame F11 and less than half of the total number of pixels of the first image frame F11. Corresponding to the second embodiment, the total number of pixels in the fourth judgment area A14 may also be between 801 and 240000.

Step S19 is to obtain a plurality of second pixel feature values associated with the fourth judgment area A14 of the second image frame F12. Similar to the description of the first image frame F11 in step S18, each pixel of the second image frame F12 in the second embodiment has a second pixel feature value. The definition of the second pixel feature value is the same as the definition of the first pixel feature value and the definition of the fourth judgment area A14 is also the same as that described in step S18, which will not be repeated here.

In the second embodiment, the total number of pixels of the fourth judgment area A14 is taken as an example to be equal to the total number of pixels of the fourth side B14 of the second image frame F12. Therefore, in step S19, 800 second pixel feature values will be obtained, and these second pixel feature values correspond to 800 pixels closest to the fourth side B14 of the second image frame F12.

It should be noted that the execution sequence of steps S12 to S19 is only an example and not limited. That is, the steps for the first image frame F11 may be performed first and the steps for the second image frame F12 are then performed.

Please refer to FIG. 4B, step S20 is to compare the first pixel feature values of the first judgment area A11 of the first image frame F11 with the second pixel feature values of the first judgment area A11 of the second image frame F12, and thereby to obtain a first difference feature value. In the second embodiment, the 600 first pixel feature values and 600 second pixel feature values obtained above are compared to obtain the first difference feature value. Since the first image frame F11 only has a mouse, the second image frame F12 includes an image of the hand of the user near the first side B11 in addition to the mouse. In other words, among the 600 second pixel feature values, some of the second pixel feature values are different from the first pixel feature values at the same position due to the presence of the hand.

There are various comparison methods for the difference between the first pixel feature value and the second pixel feature value. The following is an example to illustrate one of the comparison methods. Here, the first pixel feature value corresponding to a pixel in the first judgment area A11 of the first image frame F11 is compared with the second pixel feature value corresponding to the pixel in the first judgment area A11 of the second image frame F12. Afterwards, the above-mentioned comparison process is also sequentially performed on other pixels. In detail, the comparison method is to compare the numerical differences of the first pixel feature value and the second pixel feature value of 600 corresponding to the same pixel one by one. When there is one difference, the value of the difference feature value with the default value of 0 can be +1. For example, if the hand occupies 360 pixels of the first side B11 of the second image frame F12, the accumulated difference feature value is 360. In other words, the difference feature value is the number of differences associated with the first pixel feature values and the second pixel feature values.

Step S21 is to compare the first pixel feature values of the second judgment area A12 of the first image frame F11 with the second pixel feature values of the second judgment area A12 of the second image frame F12, and thereby to obtain a second difference feature value. Step S22 is to compare the first pixel feature values of the third judgment area A13 of the first image frame F11 with the second pixel feature values of the third judgment area A13 of the second image frame F12, and thereby to obtain a third difference feature value. Step S23 is to compare the first pixel feature values of the fourth judgment area A14 of the first image frame F11 with the second pixel feature values of the fourth judgment area A14 of the second image frame F12, and thereby to obtain a fourth difference feature value.

In the second embodiment, the method for obtaining the second difference feature value, the third difference feature value, and the fourth difference feature value in step S21 to step S23 is similar to the method for obtaining the first difference feature value in step S20. In the second embodiment, since no object enters the photographed range through the second side B12, the third side B13, and the fourth side B14 of the image frame, therefore, the second difference feature value, the third difference feature value, and the fourth difference feature value are 0, respectively. In other embodiments, a little bit of the difference feature value is also possible if there are tiny objects or changes in ambient light.

Step S24 is to compare the first difference feature value, the second difference feature value, the third difference feature value, and the fourth difference feature value to obtain the maximum difference value. In the second embodiment, since the first difference feature value is 360 and the second difference feature value, the third difference feature value, and the fourth difference feature value are all 0, therefore, the maximum difference feature value is 360, and it corresponds to the first side B11.

Step S25 is to determine whether the maximum difference feature value is greater than a threshold. Step S26 is performed if the determined result is "Yes" and step S11 is repeated if the determined result is "No".

In step S26, when the maximum difference feature value is greater than the threshold, the image frames output by the image capture unit 21 are rotated according to the first side B11 corresponding to the maximum difference feature value so that the first side B11 of each image frame is corresponding to the predetermined display side of the display unit 31. In other embodiments, if the maximum difference feature value corresponds to the second side B12, the third side B13, or the fourth side B14, the image frames output by the image capture unit 21 will be rotated so that the corresponding side is corresponding to the predetermined display side of the display unit 31.

In the second embodiment, the threshold can be set to be greater than or equal to 25% of the total number of pixels of the first judgment area A11, the second judgment area A12, the third judgment area A13, and the fourth judgment area A14. In other words, when corresponding to the first judgment area A11 and the third judgment area A13, since the total number of pixels is 600, the threshold is 150, and when corresponding to the second judgment area A12 and the fourth judgment area A14, since the total number of pixels is 800, the threshold is 200. In other embodiments, according to different required sensitivity, the user can also manually adjust the threshold to a value such as 10%, 30%, or 50%, which is not limited herein.

Since the difference feature value obtained above is 360, which is greater than the threshold (150) of the embodiment, and the maximum difference value is corresponding to the first side B11, therefore, the image frame output by the image capture unit 21 will be automatically rotated by an angle so that the first side B11 of the image frame is located on the side of the predetermined display side of the display unit 31. In the embodiment, the first side B11 of the image frame is rotated to correspond to the first display side D01 of the display unit 31. Accordingly, the direction of the image observed by the user on the display unit 31 will be the same as the direction in which the user operates the document camera 20, and the photographed subject 40 on the placement platform 22 can be adjusted intuitively.

Figure 6:
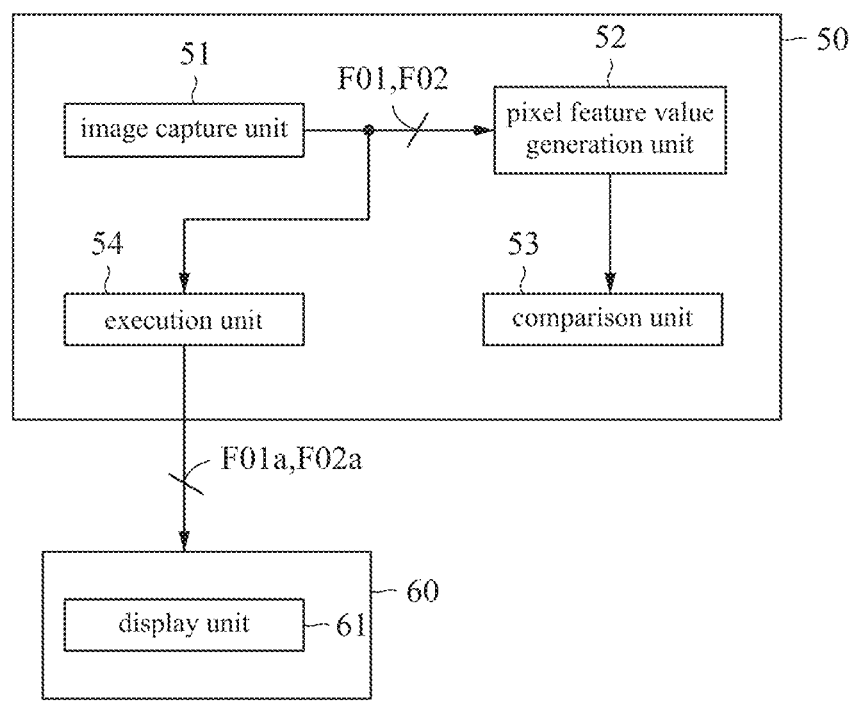
FIG. 6 is a schematic diagram showing the structure of the orientation adjustment device of the displayed image according to the third embodiment of the present invention.

FIG. 6 is a schematic diagram of the orientation adjustment device of the displayed image according to the third embodiment of the present invention. As shown in FIG. 6, the orientation adjustment device 50 of the displayed image is applied in cooperation with a display device 60. The orientation adjustment device 50 includes an image capture unit 51, a pixel feature value generation unit 52, a comparison unit 53, and an execution unit 54. The orientation adjustment device 50 can be integrated into the document camera 20 shown in FIG. 1A in the foregoing embodiment, in other words, the image capture unit 51 can be the image capture unit 21 described in the foregoing embodiment. The display device 60 has a display unit 61, which is the same as the aforementioned display unit 31, has the display edge D1, which is composed of the first display side D01, the second display side D02, the third display side D03, and the fourth display side D04.

Please refer to FIGS. 6, 3A and 3B, the image capture unit 51 sequentially captures and outputs the first image frame F01 and the second image frame F02 according to a photographed subject, and each of the image frames F01 and F02 respectively has the capturing edge B1. Same as the previous embodiment, the capturing edge B1 includes the first side B11, the second side B12, the third side B13 and the fourth side B14.

The pixel feature value generation unit 52 is electrically connected to the image capture unit 51 to obtain a plurality of first pixel feature values associated with the first judgment area A01 in the first image frame F01 and to obtain a plurality of second pixel feature values associated with the first judgment area A01 in the second image frame F02. The first judgment area A01 is close to the first side B11.

The comparison unit 53 is electrically connected to the pixel feature value generation unit 52, and a maximum difference feature value is obtained according to the first pixel feature values and the second pixel feature values.

The execution unit 54 is electrically connected to the comparison unit 53 and the image capture unit 51 respectively and rotates the image frames F01 and F02 output by the image capture unit 51 when the maximum difference feature value is greater than the threshold. The execution unit 54 generates and outputs the rotated first image frame F01a and the rotated second image frame F02a so that the first side B11 of each image frame F01, F02 corresponds to the predetermined display side of the display unit 61 of the display device 60.

The pixel feature value generation unit 52, the comparison unit 53, and the execution unit 54 described above may be integrated into a processing unit (not shown) in addition to being individual components. In addition, since the adjustment and display of the image orientation by the orientation adjustment device 50 of the displayed image have been described in detail in the foregoing embodiments of the orientation adjustment method of the displayed image, therefore, it will not be repeated here.

As mentioned above, the orientation adjustment method and the orientation adjustment device of the displayed image of the present invention utilizes the image capture unit to capture at least two image frames at different time points and to obtain the partial differences between the two image frames after comparison. Then, after analyzing and judging the partial differences, the angle of the image frame output by the image capture unit is automatically rotated, and the display direction of the image frame on the display unit is adjusted. Accordingly, the user can adjust the direction of the image displayed in the display unit through gestures or other objects so that the user can operate the physical camera (or projector) more intuitively.

The above embodiments merely give the detailed technical contents of the present invention and inventive features thereof and are not to limit the covered range of the present invention. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An orientation adjustment method of a displayed image is performed by an image capture unit and a display unit, the image capture unit outputs a plurality of image frames according to a photographed subject, each image frame has a capturing edge, which at least includes a first side, a second side, and a third side,
   wherein the second side is connected to the first side and the third side,
   wherein the first side and the third side are opposite to each other, the display unit has a display edge, which has a predetermined display side, the orientation adjustment method comprising:
   capturing a first image frame and a second image frame sequentially by the image capture unit;

obtaining a plurality of first pixel feature values associated with a first judgment area in the first image frame, wherein a distance between the first judgment area and the first side is less than a distance between the first judgment area and the third side;

obtaining a plurality of second pixel feature values associated with the first judgment area in the second image frame;

obtaining a maximum difference feature value according to the first pixel feature values and the second pixel feature values; and rotating the image frames output by the image capture unit when the maximum difference feature value is greater than a threshold, so that the first side of each image frame corresponds to the predetermined display side of the display unit.

2. The orientation adjustment method of claim 1, wherein the total number of pixels in the first judgment area is equal to the total number of pixels on the first side of the first image frame, and the maximum difference feature value is associated with the difference between the first pixel feature values and the second pixel feature values.

3. The orientation adjustment method of claim 1, wherein the total number of pixels of the first judgment area is greater than the total number of pixels of the first side of the first image frame and the total number of pixels of the first judgment area is less than half of the total number of pixels of the first image frame.

4. The orientation adjustment method of claim 1, further comprising:
comparing the first pixel feature values of the first judgment area of the first image frame with the second pixel feature values of the first judgment area of the second image frame, thereby obtaining a first difference feature value, and setting the first difference feature value as the maximum difference feature value.

5. The orientation adjustment method of claim 4, wherein the step of compare the first pixel feature values of the first judgment area of the first image frame with the second pixel feature values of the first judgment area of the second image frame, thereby obtaining a first difference feature value, and setting the first difference feature value as the maximum difference feature value, comprising:
sequentially comparing the first pixel feature value corresponding to a pixel in the first judgment area of the first image frame with the second pixel feature value corresponding to the pixel in the first judgment area of the second image frame.

6. The orientation adjustment method of claim 1, further comprising:
obtaining a plurality of first pixel feature values associated with a second judgment area in the first image frame, wherein the capturing edge of each image frame further includes a fourth side,
wherein the fourth side is connected to the first side and the third side,
wherein the fourth side and the second side are opposite to each other,
wherein a distance between the second judgment area and the second side is less than a distance between the second judgment area and the fourth side;
obtaining a plurality of second pixel feature values associated with the second judgment area in the second image frame;
comparing the first pixel feature values of the first judgment area of the first image frame with the second pixel feature values of the first judgment area of the second image frame, thereby obtaining a first difference feature value;
comparing the first pixel feature values of the second judgment area of the first image frame with the second pixel feature values of the second judgment area of the second image frame, thereby obtaining a second difference feature value; and
comparing the first difference feature value with the second difference feature value to obtain the maximum difference feature value.

7. The orientation adjustment method of claim 6, wherein after capturing the first image frame and the second image frame, the orientation adjustment method further comprises:
obtaining a plurality of first pixel feature values associated with a third judgment area in the first image frame, wherein a distance between the third judgment area and the third side is less than a distance between the third judgment area and the first side;
obtaining a plurality of second pixel feature values associated with the third judgment area in the second image frame;
obtaining a plurality of first pixel feature values associated with a fourth judgment area in the first image frame, wherein a distance between the fourth judgment area and the fourth side is less than a distance between the fourth judgment area and the second side;
obtaining a plurality of second pixel feature values associated with the fourth judgment area in the second image frame;
comparing the first pixel feature values of the third judgment area of the first image frame with the second pixel feature values of the third judgment area of the second image frame, thereby obtaining a third difference feature value;
comparing the first pixel feature values of the fourth judgment area of the first image frame with the second pixel feature values of the fourth judgment area of the second image frame, thereby obtaining a fourth difference feature value; and
comparing the first difference feature value, the second difference feature value, the third difference feature value, and the fourth difference feature value to obtain the maximum difference feature value.

8. An orientation adjustment device of a displayed image, which is cooperated with a display unit, the display unit has a display edge having a predetermined display side, comprising:
an image capture unit, which sequentially captures and outputs a first image frame and a second image frame according to a photographed subject, each image frame has a capturing edge, and the capturing edge includes at least a first side, a second side, and a third side,
wherein the second side is connected to the first side and the third side,
wherein the first side and the third side are opposite to each other;
a pixel feature value generation unit, which is electrically connected to the image capture unit, obtains a plurality of first pixel feature values associated with a first judgment area in the first image frame, and obtains a plurality of second pixel feature values associated with the first judgment area in the second image frame, wherein a distance between the first judgment area and the first side is less than a distance between the first judgment area and the third side;

a comparison unit, which is electrically connected to the pixel feature value generation unit, and obtains a maximum difference feature value according to the first pixel feature values and the second pixel feature values; and an execution unit, which is electrically connected to the comparison unit and the image capture unit respectively and rotates the image frames output by the image capture unit when the maximum difference feature value is greater than a threshold so that the first side of each image frame corresponds to the predetermined display side of the display unit.

9. The orientation adjustment device of claim 8, wherein the total number of pixels in the first judgment area is equal to the total number of pixels on the first side of the first image frame, and the maximum difference feature value is related to the difference between the first pixel feature values and the second pixel-feature values.

10. The orientation adjustment device of claim 8, wherein the total number of pixels of the first judgment area is greater than the total number of pixels of the first side of the first image frame, and the total number of pixels of the first judgment area is less than half of the total number of pixels of the first image frame.

11. The orientation adjustment device of claim 8, wherein the comparison unit compares the first pixel feature values of the first judgment area of the first image frame with the second pixel feature values of the first judgment area of the second image frame thereby obtaining a first difference feature value and sets the first difference feature value as the largest difference feature value.

12. The orientation adjustment device of claim 11, wherein the comparison unit sequentially compares the first pixel feature value corresponding to a pixel in the first judgment area of the first image frame with the second pixel feature value corresponding to the pixel in the first judgment area of the second image frame.

* * * * *